(12) United States Patent
Ruegsegger et al.

(10) Patent No.: US 9,738,390 B2
(45) Date of Patent: Aug. 22, 2017

(54) REINFORCED SLIDE TUBE

(71) Applicant: Goodrich Corporation, Charlotte, NC (US)

(72) Inventors: Nicolas Ruegsegger, Glendale, AZ (US); Steven Evans, Sun City, AZ (US); Jonathan Glassner, Lincolnwood, IL (US)

(73) Assignee: Goodrich Corporation, Charlotte, NC (US)

( * ) Notice: Subject to any disclaimer, the term of this patent is extended or adjusted under 35 U.S.C. 154(b) by 125 days.

(21) Appl. No.: 14/738,782

(22) Filed: Jun. 12, 2015

(65) Prior Publication Data
US 2016/0362186 A1 Dec. 15, 2016

(51) Int. Cl.
*B64D 25/14* (2006.01)

(52) U.S. Cl.
CPC .................... *B64D 25/14* (2013.01)

(58) Field of Classification Search
CPC .. B64D 25/14; B64C 1/34; B64C 3/30; B64C 25/56; B64G 2001/224; E04H 15/20; E04H 2015/201; E04H 2015/202; E04H 2015/203
See application file for complete search history.

(56) References Cited

U.S. PATENT DOCUMENTS

| 3,464,515 A | 9/1969 | Evans |
| 3,473,641 A | 10/1969 | Fisher |
| 3,575,776 A | 4/1971 | MacIntyre |
| 3,712,417 A * | 1/1973 | Chacko ............... B64D 25/14 182/48 |
| 5,421,128 A | 6/1995 | Sharpless et al. |
| 5,677,023 A | 10/1997 | Brown |
| 5,871,180 A * | 2/1999 | Hublikar ............ B64D 25/14 193/25 B |
| 5,875,868 A | 3/1999 | Smialowicz et al. |
| 6,463,699 B1 | 10/2002 | Bailey et al. |
| 7,562,493 B2 | 7/2009 | Kassianoff |
| 8,640,386 B1 | 2/2014 | Griffith et al. |
| 9,015,998 B2 | 4/2015 | Turcot |
| 2009/0049757 A1 | 2/2009 | Potter |

FOREIGN PATENT DOCUMENTS

| DE | 19917188 A1 | 10/2000 |
| EP | 0034358 A2 | 8/1981 |
| EP | 0864493 A2 | 9/1998 |
| WO | WO2004020284 A2 | 3/2004 |

OTHER PUBLICATIONS

Extended European Search Report, for European Patent Application No. 16174198.8, dated Oct. 25, 2016, 7 pages.

* cited by examiner

*Primary Examiner* — Nicholas McFall
(74) *Attorney, Agent, or Firm* — Kinney & Lange, P.A.

(57) ABSTRACT

An embodiment of an inflatable tube includes an elongated tube portion formed from a first fabric, the tube portion including at least one outer wall segment defining a cavity therein. A web is formed from a second fabric, and includes two or more edges secured to an interior surface of the at least one outer wall segment such that the web is disposed along a portion of a tube length.

19 Claims, 5 Drawing Sheets

REINFORCED SLIDE TUBE

BACKGROUND

The disclosure relates generally to inflatable apparatus and more specifically to inflatable apparatus for aircraft.

Inflatable aircraft escape slides have several requirements including beam strength of the tubes. Tests simulate the effect of tightly grouped evacuees, so as to maximize the number of evacuees who can safely and quickly exit the aircraft in real-life deployment.

Existing modes of strengthening evacuation slides have attendant weight penalties. Thicker walls and/or larger tubes use more structural material for a relatively small increase in strength. Similarly, increased pressures require larger and/or higher pressure inflation bottles, both of which also increase weight of the slide assembly.

SUMMARY

An embodiment of an inflatable slide assembly includes an inflatable support frame, a first web, and a second web. The inflatable support frame includes an elongated second tube spaced from an elongated first tube. The first and second tubes are formed from a first fabric, and each includes at least one outer wall segment defining a cavity therein. The first web and second web are formed from a second fabric, and each web includes two or more edges. The edges are secured to respective interior surfaces of the respective outer wall segments such that the first web extends longitudinally along a portion of a first tube length $L_1$ to define a first reinforced tube portion. The second web extends longitudinally along a portion of a second tube length $L_2$ to define a second reinforced tube portion.

An embodiment of an inflatable tube includes an elongated tube portion formed from a first fabric, the tube portion including at least one outer wall segment defining a cavity therein. A web is formed from a second fabric, and includes two or more edges secured to an interior surface of the at least one outer wall segment such that the web is disposed along a portion of a tube length.

DETAILED DESCRIPTION

Inflatable aircraft escape slides have several requirements including beam strength of the tubes so that groups of evacuees can safely and quickly exit the aircraft. A reinforcing web is provided on the interior of the tube, along a portion of its length, so as to supplement beam strength of the tube with minimal weight penalties seen with thicker walls and/or higher inflation pressures.

Figure 1A:
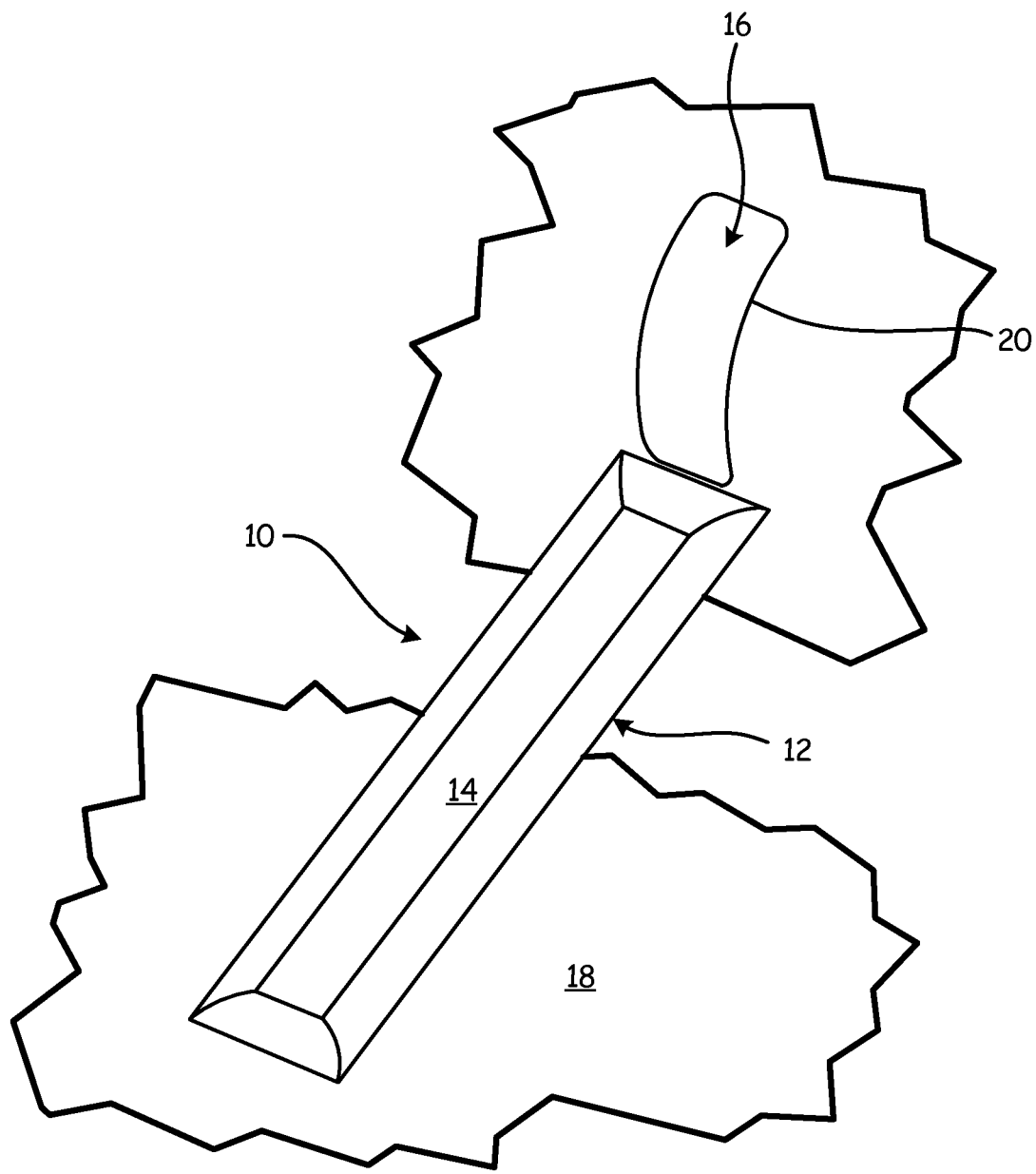
FIG. 1A is a schematic view of an aircraft evacuation slide in the deployed position from a door of an aircraft.

FIG. 1A schematically depicts inflatable slide assembly 10, which generally includes inflatable support frame 12 and slide ramp 14 secured thereto. In this illustrative example, slide assembly 10 is shown in a deployed configuration, providing access from aircraft cabin 16 to ground 18. It will be recognized that slide assembly 10, in most scenarios, is stored in a stowed configuration, most typically in a compartment near aircraft exit 20, until needed for evacuation. Exit 20 can be a standard boarding door or any other openings configured for emergency use (e.g., window exits, tail chutes, etc.).

Figure 1B:
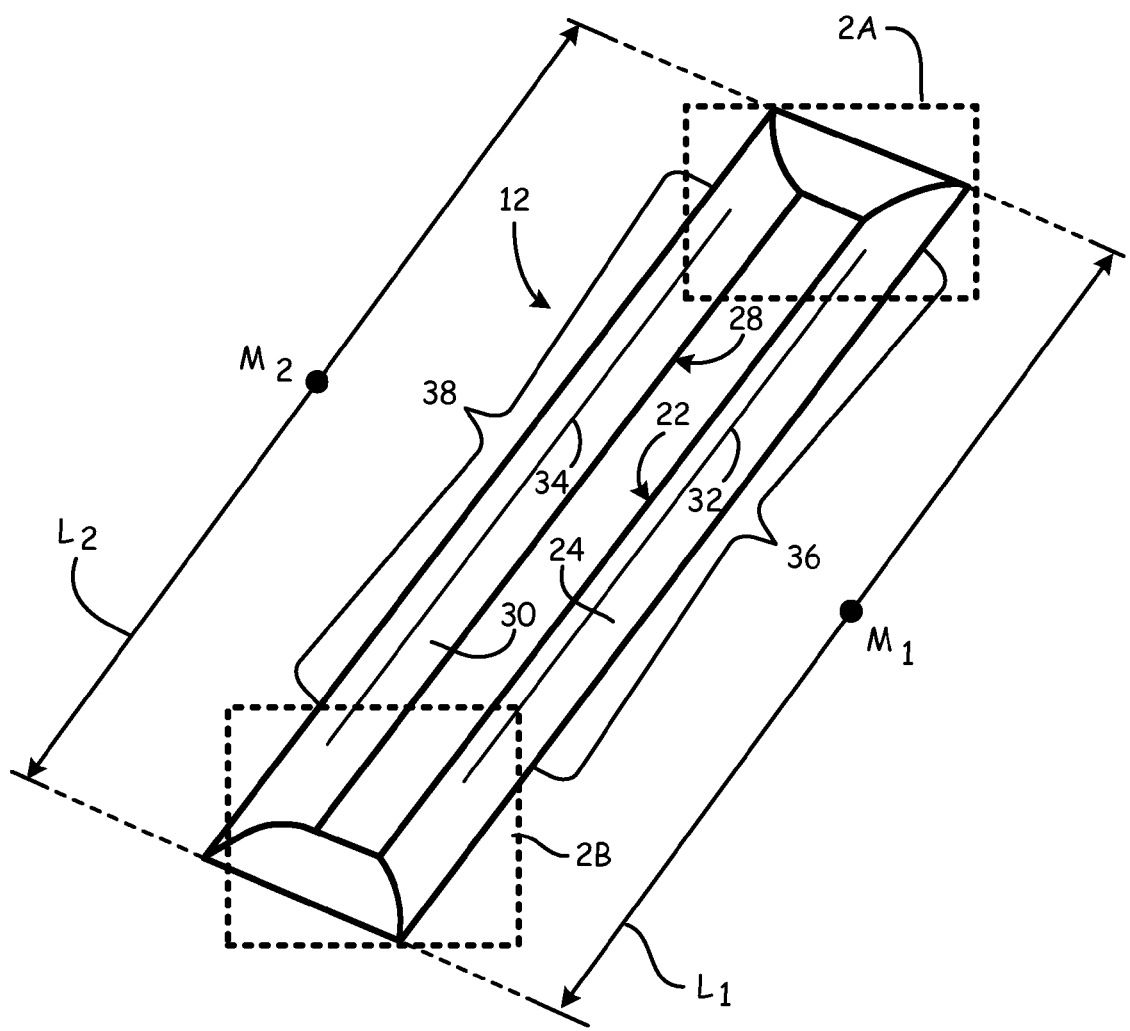
FIG. 1B shows an inflatable support frame for a slide in an inflated/deployed configuration.

FIG. 1B better illustrates aspects of inflatable support frame 12, which can include at least one elongated tube to support slide ramp 14 (omitted, shown in FIG. 1A). In FIG. 1B, first tube 22 includes at least a first outer wall segment 24 defining a first cavity therein (not visible). FIG. 1B also shows elongated second tube 28 spaced laterally from first tube 22. Second tube 28 can include at least one second outer wall 30 defining a second cavity (not visible) therein.

Figure 3A:
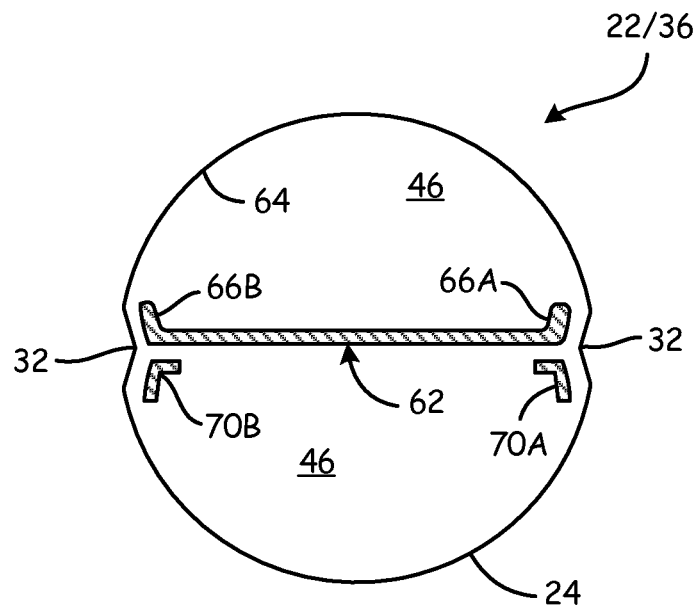
FIG. 3A is a cross-sectional view of the upper portion of one slide tube.
Figure 3B:
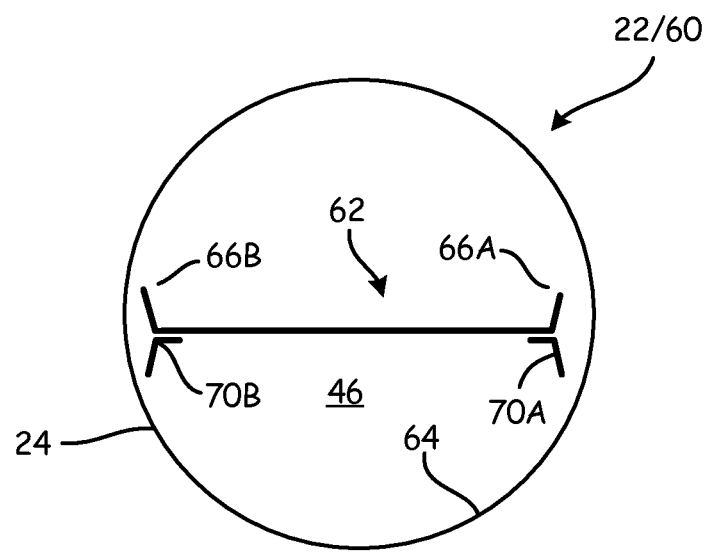
FIG. 3B is a cross-sectional view of the lower portion of one slide tube.

Inflatable support frame 12 can be provided with at least one inflation inlet providing communication of pressurized fluid into one or more cavities (best seen in FIGS. 3A and 3B). Appropriate controls and means for inflation can be provided in or around exit 20, but are omitted from FIG. 1B for clarity. This location is merely one example, and can vary significantly depending on a number of other factors.

Both first and second outer walls 24, 30 can be formed from a first fabric, such as a nylon derivative or other substrate. The individual fibers and/or the fabric as a whole can also be treated with a coating or matrix to slow deflation and retard heat, water, and fire damage.

Also visible in FIG. 1B are first ridge 32 and second ridge 34. These correspond to first and second webs disposed along a portion of each corresponding first and second tube lengths $L_1$ and $L_2$. As best seen in example ridge 32 in FIG. 3A, each web can include two or more edges secured to respective interior surfaces of the first and second outer wall segments. As noted in more detail below, one or both webs can be formed from a second fabric. In certain embodiments, the first and second fabrics have substantially identical substrates but different coatings or other surface treatments.

A combination of the outer wall segment and corresponding web defines respective reinforced portions of first and second tubes 22, 28. Here, first tube 22 includes first reinforced tube portion 36 and second tube includes second reinforced tube portion 38. In this example, first reinforced tube portion 36 includes midpoint $M_1$ of first tube length $L_1$ (shown in FIG. 1B), and second reinforced tube portion 38 includes midpoint $M_2$ of second tube length $L_2$ (also shown in FIG. 1B). Reinforcing at least the middle of each tube 22, 28 strengthens frame 12 particularly when groups of evacuees (real or simulated) are clustered together on slide assembly 10 (shown in FIG. 1A). In certain embodiments, it allows for reinforcement of less than the entire tube lengths $L_1$ and $L_2$.

Figure 2A:
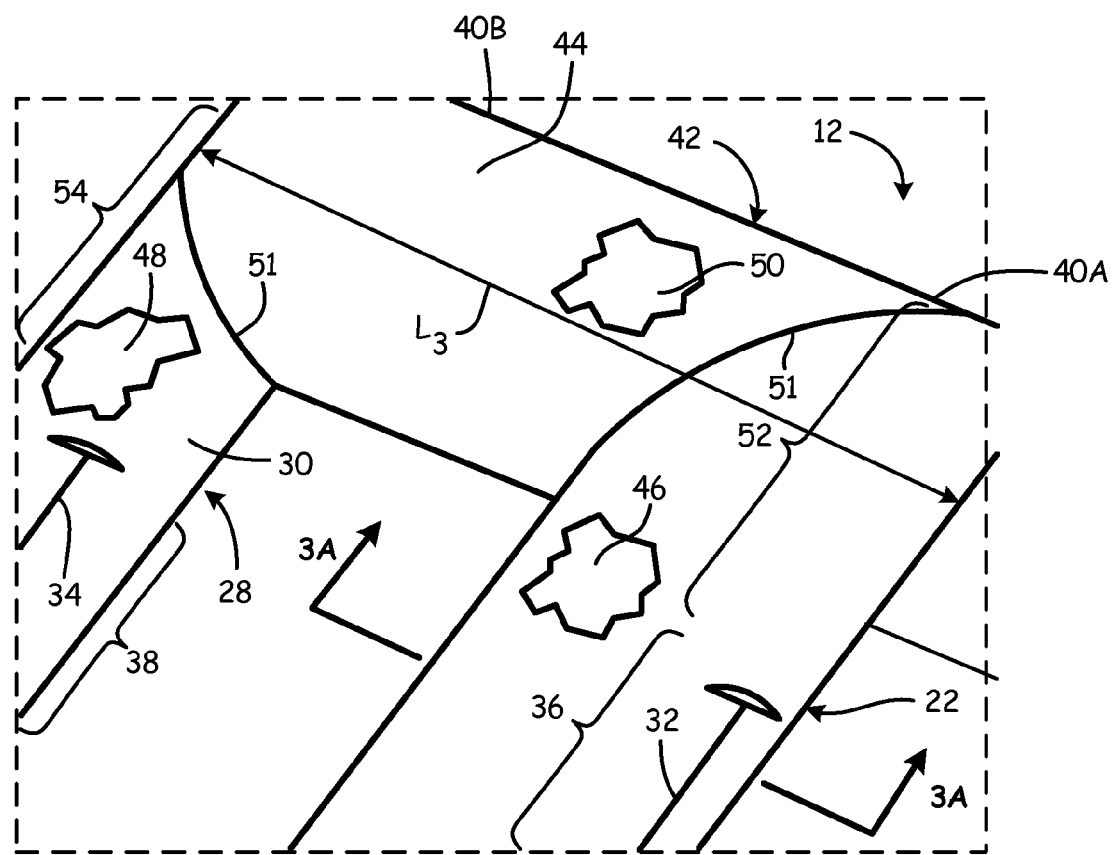
FIG. 2A shows an upper portion of the deployed evacuation slide.
Figure 2B:
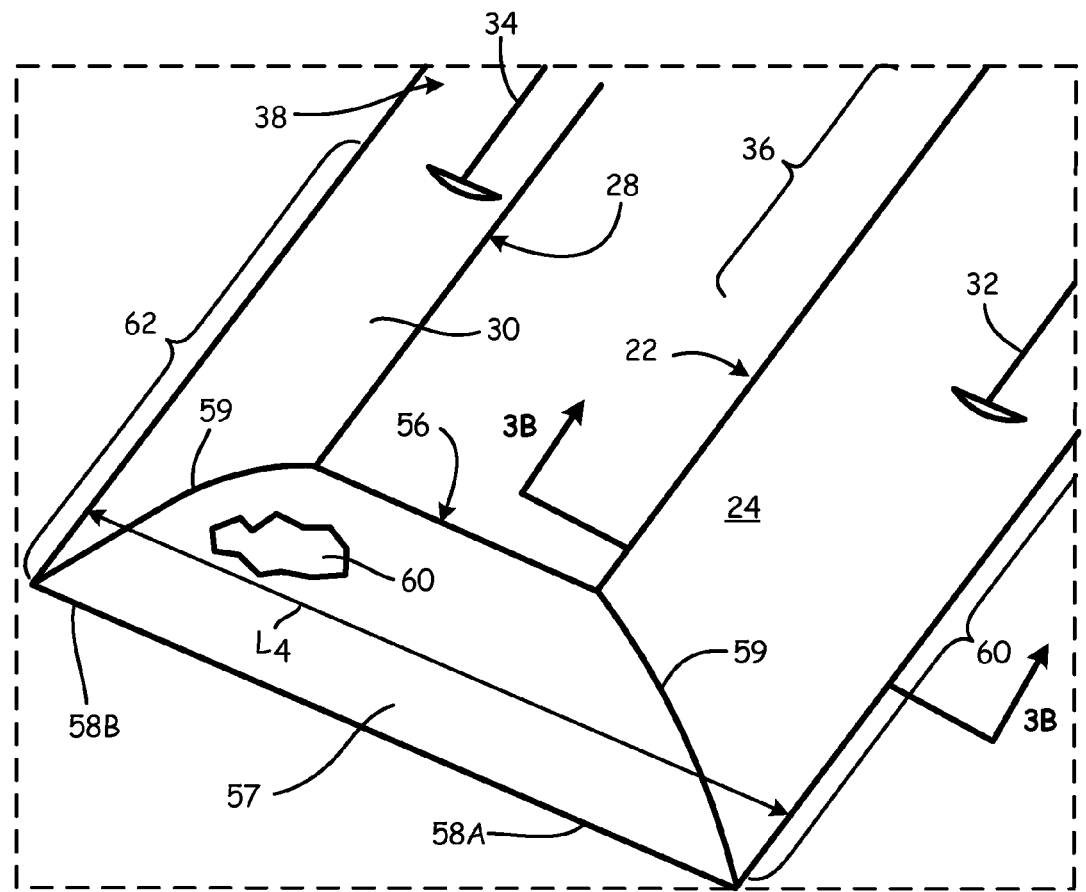
FIG. 2B shows a lower portion of the deployed evacuation slide.

There are two portions of frame 12 highlighted in FIG. 1B, and which are shown in magnified form in the two subsequent figures. FIG. 2A shows an upper portion of frame 12, and FIG. 2B shows a lower portion of frame 12. This is done to illustrate that one or both tubes 22, 28 of frame 12 can each define a single inflation chamber, and is not fully subdivided by an internal web. This simplifies inflation while increasing beam strength. In other alternative embodiments, one or both webs can extend through the full tube length $L_1$, $L_2$, thereby defining multiple inflation chambers in each tube 22, 28.

FIG. 2A shows an upper portion of frame 12, with first tube 22 and second tube 28. In certain embodiments, such as the example shown in FIGS. 1A and 1B, assembly 10 is configured such that inflatable support frame 12 also includes one or more end trusses which connect first and second tubes 22, 28. In this illustrative example, first end truss 42 connects upper end 40A of first tube portion 22 with upper end 40B of second tube portion 28. First end truss 42 can include at least one corresponding outer wall segment 44, and can have third tube length $L_3$. Third outer wall segment 44 can be contiguous with first and second outer wall segments 24, 30 (e.g., at seams 51) so that first cavity 46 and second cavity 48 can be in communication with a third cavity 50, defined by third outer wall segment 44. At least the first, second, and third cavities 46, 48, 50 can then define a single inflation chamber (best seen in FIG. 3B).

Note in FIG. 2A that first ridge 32 ends short of first tube upper end 40A, as well as second ridge 34 ending short of second tube upper end 40B. This indicates that the first tube 22 contains the corresponding first web within less than the full tube length $L_1$ such that tube 22 can define a single inflation chamber. Similarly, second tube 28 contains the corresponding second web within less than the full tube length $L_2$ such that tube 28 can also define a single inflation chamber. FIG. 2A thus shows upper ends of first reinforced tube portion 36 and second reinforced tube portion 38, as well as upper unreinforced tube portions 52, 54.

FIG. 2B shows a lower portion of frame 12, also with first tube 22 and second tube 28. In this illustrative example, FIG. 2B also shows lower ends of reinforced tube portions 36, 38, as well as lower unreinforced tube portions 52, 54. Second end truss 56 (with fourth outer wall segment 57) connects lower end 58A of first tube 22 with lower end 58B of second tube 28. In FIG. 2B, first ridge 32 ends short of first tube lower end 58A, as well as second ridge 34 ending short of second tube lower end 58B. Fourth outer wall segment 57 can be contiguous with first and second outer wall segments 24, 30 (e.g., at seams 59) so that first cavity 46 and second cavity 48 can additionally or alternatively be in communication with a fourth cavity 60, defined by fourth outer wall segment 57.

Typically, to maintain a single inflation chamber, the reinforced portion of the tube excludes at least one end of the tube length. In tube 22, it can be seen that the reinforced portion of the tube length 36 excludes upper end 40A (shown in FIG. 2A) and lower end 58A (shown in FIG. 2B).

In this example, the inflatable first and second end trusses in communication with the inflatable first and second tubes results in a single inflatable frame having a generally rectangular shape when viewed from above or below. (See FIG. 1B). In certain alternative examples, one or both end trusses are not inflatable and merely are present to ensure correct tube spacing and securement location(s) for the slide surface, rather than any substantial structural support or reinforcement.

It should also be noted that the terms "upper" and "lower" are generally described from the point of reference of a deployed slide in an aircraft. However, it will be appreciated that in some embodiments, one or more components are symmetrical in nature such that the "upper" and "lower" elements are identical to, or mirror images of, each other. It will also be recognized that other embodiments can include asymmetrical elements which may or may not permit installation or deployment in an opposing orientation.

FIG. 3A shows a sectional view of elongated first tube 22 with first reinforced tube portion 36. First tube 22 includes a cross-sectional area defined by first outer wall segment 24. Across the cross-sectional area, reinforcing web 62 is provided to locally and globally strengthen tube 22 (and in turn, frame 12 shown in FIG. 1B).

Web 62 can be secured at one or more locations on interior surface 64 of first outer wall segment 24. In this example, edges 66A, 66B of web 62 are secured intermittently or continuously along interior surface 64 of reinforced tube portion 36.

Web 62, which can be in tension, then divides first cavity 46 into two sections. However, because web 62 does not extend completely longitudinally through the entirety of tube length $L_1$, the inflation fluid is free to flow around web 62 and allow first cavity 46 to remain a single inflation chamber.

To further secure web 62 along inner surface 64 of reinforced tube portion 36, additional fabric can optionally be provided as backing 70A, 70B along both edges of web 62. Note that first edge 66A and second edge 66B of web 62 are secured to interior surface 64 approximately 180 degrees apart in the cavity.

For example, in the arrangement shown in FIG. 3A, a generally horizontal orientation of web 62 is expected to greatly improve beam strength when the frame is in an inflated or unpacked configuration. This is because, at least with respect to the non-limiting embodiment of a slide and slide frame shown herein, the slide surface (e.g., slide ramp 14 in FIG. 1A) tends to dip as a person travels downward away from the aircraft. This causes the side tubes (e.g., first tube 22 and second tube 28) to pull inward, like an hour glass, which first buckles the tubes horizontally, then vertically.

A generally horizontal orientation of web 62 has been found in many instances to decrease buckling in the tube in a direction normal to the web. This is believed to occur by the web reacting an external force on the tube that is orthogonal to the web. The tube is expected to react by compressing in the direction of the external force, and expanding or "pushing out" in a direction generally coplanar to the web. This coplanar expansionary force thereby pulls the sides of the generally horizontally oriented web into tension, which increases stiffness of the tube and resists the expansionary movement. As such, this generally horizontal orientation of web 62 resists buckling of the tube in the direction orthogonal to the web.

Since the web adds no additional stiffness while under compression, but significantly improves tube stiffness while under tension, the web(s) can be oriented in a manner such that they will be orthogonal to one or more expected or actual loading vector(s). These loading vector(s) can be ones which are most likely to result in weakness or failure of the entire system based on one or more potential operating conditions.

However, it will be recognized that certain slide configurations may call for adjusting the configuration of the entire web (or portions thereof) within one or more tubes. The orientation direction of one or more web portions and angular separation between the securement locations may work better at different angles on different slides. In one non-limiting example, a web can be arranged to be in a substantially vertical orientation (when the frame is in an unpacked or inflated configuration) so as to reinforce a tube against wind shear. The web position can also be locally adjusted to spread out forces in a particular region which may be otherwise prone to buckling under certain loads. Thus the orientation of the web may vary and can be used at any angle depending on the direction of the buckling problem which presents itself for a given slide configuration.

In contrast with reinforced tube portion 36 shown in FIG. 3A, FIG. 3B depicts a sectional view of elongated first tube 22 with unreinforced tube portion 58. Tube 22 can include a similar cross-sectional area defined by outer wall segment 24. In FIG. 3B, respective edges of web 62 and backings 70A, 70B are visible as well.

The number and size of intermediate trusses can be reduced or eliminated based on the inclusion of one or more reinforcing webs. The web(s) increase beam strength without significantly adding weight to the slide assembly and/or the inflation means as described herein. However, such arrangements does not preclude the addition of intermediate structural trusses, either inflatable or external, to further strengthen the support frame beyond that which is facilitated by addition of one or more reinforcing webs.

As noted with respect to FIGS. 1A and 1B, first and second outer walls 24, 30 can be formed from a first fabric, including a nylon derivative or other substrate. The substrate can also be treated with a coating or matrix to slow deflation and retard heat, water, and fire damage.

Web 62 can be formed from a second fabric which may or may not be substantially identical in composition and/or weave as the substrate for the first fabric. Generally, though not absolutely required, the second fabric for web 62 can remain uncoated. This is both to save weight and cost, as well as to retain some small amount of permeability for the inflation fluid to pass therethrough. In the example shown, web 62 includes an uncoated nylon substrate, while outer wall 24 is nylon coated with a heat-resistant hydrophobic substrate.

It should be noted that directional terms, such as but not limited to 'horizontal' and 'vertical', refer primarily to the orientations shown in the accompanying drawings, unless otherwise described.

Discussion of Possible Embodiments

The following are non-exclusive descriptions of possible embodiments of the present disclosure.

An embodiment of an inflatable slide assembly includes an inflatable support frame, a first web, and a second web. The inflatable support frame includes an elongated second tube spaced from an elongated first tube. The first and second tubes are formed from a first fabric, and each includes at least one outer wall segment defining a cavity therein. The first web and second web are formed from a second fabric, and each web includes two or more edges. The edges are secured to respective interior surfaces of the respective outer wall segments such that the first web extends longitudinally along a portion of a first tube length $L_1$ to define a first reinforced tube portion. The second web extends longitudinally along a portion of a second tube length $L_2$ to define a second reinforced tube portion.

The inflatable slide assembly embodiment of the preceding paragraph can optionally include, additionally and/or alternatively, any one or more of the following features, configurations and/or additional components:

An assembly according to an exemplary embodiment of this disclosure, among other possible things includes an inflatable support frame comprising: an elongated first tube formed from a first fabric, the first tube including at least a first outer wall segment defining a first cavity therein; and an elongated second tube spaced laterally from the first tube, the second tube formed from the first fabric including at least a second outer wall segment defining a second cavity therein; and a first web and a second web formed from a second fabric, the first and second webs each including two or more edges secured to respective interior surfaces of the first and second outer wall segments such that the first web extends longitudinally along a portion of a first tube length $L_1$ to define a first reinforced tube portion, and the second web is extends longitudinally along a portion of a second tube length $L_2$ to define a second reinforced tube portion.

A further embodiment of the foregoing assembly, further comprising a slide ramp secured to and supported by at least the first and second tubes.

A further embodiment of any of the foregoing assemblies, wherein the second fabric material includes a second substrate substantially identical to a first substrate of the first fabric material.

A further embodiment of any of the foregoing assemblies, wherein the first reinforced tube portion containing the first web is less than the full first tube length $L_1$ such that the first tube includes a single inflation chamber.

A further embodiment of any of the foregoing assemblies, wherein the first reinforced tube portion includes a midpoint $M_1$ of the first tube length $L_1$ and the second reinforced tube portion includes a midpoint $M_2$ of the second tube length $L_2$.

A further embodiment of any of the foregoing assemblies, wherein the inflatable support frame further comprises a first end truss connecting an upper end of the first tube and an upper end of the second tube; and a second end truss connecting a lower end of the first tube and a lower end of the second tube.

A further embodiment of any of the foregoing assemblies, wherein at least one of the first end truss and the second end truss comprises a third outer wall segment having a third tube length and a third tube cross-sectional area defining a third cavity therein.

A further embodiment of any of the foregoing assemblies, wherein the third cavity is in communication with the first and second cavities such that the first, second, and third cavities define a single inflation chamber.

A further embodiment of any of the foregoing assemblies, wherein at least a portion of one of the first web and the second web is oriented substantially horizontally when the frame is in an unpacked configuration.

A further embodiment of any of the foregoing assemblies, wherein at least a portion of one of the first web and the second web is oriented substantially vertically when the frame is in an unpacked configuration.

An embodiment of an inflatable tube includes an elongated tube portion formed from a first fabric, the tube portion including at least one outer wall segment defining a cavity therein. A web is formed from a second fabric, and includes two or more edges secured to an interior surface of the at least one outer wall segment such that the web is disposed along a portion of a tube length.

The tube of the preceding paragraph can optionally include, additionally and/or alternatively, any one or more of the following features, configurations and/or additional components:

An inflatable tube according to an exemplary embodiment of this disclosure, among other possible things includes an elongated first tube portion formed from a first fabric, the first tube portion including at least one outer wall segment defining a cavity therein; and a web formed from a second fabric, the web including two or more edges secured to an interior surface of the at least one outer wall segment such that the web is disposed along a portion of a tube length.

A further embodiment of the foregoing tube, wherein the portion of the tube length having the web includes a midpoint of the tube length.

A further embodiment of any of the foregoing tubes, wherein the portion of the tube length having the web excludes at least one end of the tube length.

A further embodiment of any of the foregoing tubes, wherein the second fabric material includes a substrate substantially identical to a substrate of the first fabric material.

A further embodiment of any of the foregoing tubes, wherein the first fabric material includes a coating on the first substrate, and the second fabric material includes an uncoated second substrate.

A further embodiment of any of the foregoing tubes, wherein the portion of the tube length containing the web is less than the full tube length such that the first tube portion defines a single inflation chamber.

A further embodiment of any of the foregoing tubes, wherein the first edge and the second edge of the web are secured to the interior surface approximately 180 degrees apart in the cavity.

A further embodiment of any of the foregoing tubes, wherein at least a portion of the web is oriented substantially horizontally across the cavity when the tube is in an inflated configuration as part of a slide assembly.

A further embodiment of any of the foregoing tubes, wherein at least a portion of the web is oriented substantially vertically across the cavity when the tube is in an inflated configuration as part of a slide assembly.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An inflatable slide assembly comprising:
 an inflatable support frame comprising:
  an elongated first tube formed from a first fabric, the first tube including at least a first outer wall segment defining a first cavity therein; and
  an elongated second tube spaced laterally from the first tube, the second tube formed from the first fabric including at least a second outer wall segment defining a second cavity therein;
 a first web formed from a second fabric, the first web including two or more elongated edges secured to circumferentially spaced interior surfaces of the first outer wall segment such that the first web extends longitudinally along a portion of a first tube length $L_1$ inside the first cavity to divide the first cavity along first tube length $L_1$ into at least two sections and to define a first reinforced tube portion;
 a second web formed from the second fabric, the second web including two or more elongated edges secured to circumferentially spaced interior surfaces of the second outer wall segment such that the second web extends longitudinally along a portion of a second tube length $L_2$ inside the second cavity to divide the second cavity along second tube length $L_2$ into at least two sections and to define a second reinforced tube portion; and
 backing fabric secured to the two or more elongated edges and the interior surfaces of one or both of the first outer wall segment and the second outer wall segment.

2. The assembly of claim 1, further comprising:
 a slide ramp secured to and supported laterally by at least the first and second tubes.

3. The assembly of claim 1, wherein the second fabric material includes a second substrate having a composition substantially identical to a composition of a first substrate of the first fabric material.

4. The assembly of claim 1, wherein the first reinforced tube portion containing the first web is less than the full first tube length $L_1$ such that an inflation fluid is free to flow around the web whereby the first tube includes a single inflation chamber.

5. The assembly of claim 1, wherein the first reinforced tube portion includes a midpoint $M_1$ of the first tube length $L_1$ and the second reinforced tube portion includes a midpoint $M_2$ of the second tube length $L_2$.

6. The assembly of claim 1, wherein the inflatable support frame further comprises:
 a first end truss connecting an upper end of the first tube and an upper end of the second tube; and
 a second end truss connecting a lower end of the first tube and a lower end of the second tube.

7. The assembly of claim 6, wherein at least one of the first end truss and the second end truss comprises:
 a third outer wall segment having a third tube length and a third tube cross-sectional area defining a third cavity therein.

8. The assembly of claim 6, wherein the third cavity is in communication with the first and second cavities such that the first, second, and third cavities define a single inflation chamber.

9. The assembly of claim 1, wherein at least a portion of one of the first web and the second web is oriented substantially horizontally when the frame is in an unpacked configuration.

10. The assembly of claim 1, wherein at least a portion of one of the first web and the second web is oriented substantially vertically when the frame is in an unpacked configuration.

11. An inflatable tube comprising:
 an elongated first tube portion formed from a first fabric, the first tube portion including at least one outer wall segment defining a cavity therein;
 a web formed from a second fabric, the web including two or more elongated edges secured to circumferentially spaced interior surfaces of the at least one outer wall segment such that the web extends longitudinally along a portion of a tube length inside the cavity to divide the cavity along the tube length into at least two sections and to define a first reinforced tube; and
 backing fabric secured to the two or more elongated edges and the interior surfaces of the at least one outer wall segment.

12. The tube of claim 11, wherein the portion of the tube length having the web includes a midpoint of the tube length.

13. The tube of claim 12, wherein the portion of the tube length having the web excludes at least one end of the tube length.

14. The tube of claim 11, wherein the second fabric material includes a substrate having a composition substantially identical to a composition of a substrate of the first fabric material.

15. The tube of claim 14, wherein the first fabric material includes a coating on the first substrate, and the second fabric material includes an uncoated second substrate.

16. The tube of claim 11, wherein the portion of the tube length containing the web is less than the full tube length such that the first tube portion defines a single inflation chamber.

17. The tube of claim 11, wherein the first edge and the second edge of the web are secured to the interior surface approximately 180 degrees circumferentially apart in the inner surface of the cavity.

18. The tube of claim 11, wherein at least a portion of the web is oriented substantially horizontally across the cavity when the tube is in an inflated configuration as part of a slide assembly.

19. The tube of claim 11, wherein at least a portion of the web is oriented substantially vertically across the cavity when the tube is in an inflated configuration as part of a slide assembly.

\* \* \* \* \*